(12) United States Patent
Zeng

(10) Patent No.: US 11,159,641 B2
(45) Date of Patent: *Oct. 26, 2021

(54) METHOD AND SYSTEM FOR SHARING DATA BETWEEN TERMINALS

(71) Applicant: BANMA ZHIXING NETWORK (HONGKONG) CO., LIMITED, Kowloon (HK)

(72) Inventor: Zhonghua Zeng, Hangzhou (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/533,599

(22) Filed: Aug. 6, 2019

(65) Prior Publication Data
US 2020/0099768 A1 Mar. 26, 2020

Related U.S. Application Data

(63) Continuation of application No. 15/005,961, filed on Jan. 25, 2016, now Pat. No. 10,419,578.

(30) Foreign Application Priority Data

Jan. 30, 2015 (CN) .......................... 201510052265.0

(51) Int. Cl.
H04L 29/08 (2006.01)
H04W 8/18 (2009.01)
(Continued)

(52) U.S. Cl.
CPC ............ *H04L 67/32* (2013.01); *G06F 3/0481* (2013.01); *G06F 3/0484* (2013.01); *H04W 4/80* (2018.02); *H04W 8/18* (2013.01); *G06F 3/04883* (2013.01)

(58) Field of Classification Search
CPC .... G06F 3/0481; G06F 3/0483; G06F 3/0484; G06F 3/0488; G06F 3/04883; G06F 13/00; G06F 2221/2111; G07F 7/08; G07F 7/1008; G07G 1/12; G06Q 10/10; G06Q 20/04; G06Q 20/10; G06Q 20/20; G06Q 20/40; G06Q 20/204; G06Q 20/341; G06Q 30/02; G06Q 30/06; G06Q 30/0241; G06Q 30/0245; G06Q 30/0276; G06Q 30/0277; G06Q 40/00; G06Q 40/02; H03G 5/26; H03H 7/0161; H04B 1/26; H04B 1/1027; H04B 1/1638; H04B 1/3816; H04L 12/581; H04L 12/5895; H04L 29/06; H04L 29/08; H04L 29/06027; H04L 63/10; H04L 63/0428; H04L 63/0492; H04L 67/00;
(Continued)

(56) References Cited

U.S. PATENT DOCUMENTS 8,442,910 B2  5/2013  Morris
2008/0205647 A1  8/2008  Zhang
(Continued)

*Primary Examiner* — Robert B Harrell
(74) *Attorney, Agent, or Firm* — Van Pelt, Yi & James LLP

(57) ABSTRACT

Sharing data is disclosed including receiving a data-sharing instruction directed at an information card, and invoking a communication application to perform a specific operation, the specific operation including: transmitting to-be-shared information card data to a receiving terminal, or transmitting an identifier for the information card to a receiving terminal so that the receiving terminal downloads information card data associated with the information card based on the identifier.

18 Claims, 13 Drawing Sheets

(51) Int. Cl.
*G06F 3/0484* (2013.01)
*G06F 3/0481* (2013.01)
*H04W 4/80* (2018.01)
*G06F 3/0488* (2013.01)

(58) Field of Classification Search
CPC .... H04L 67/32; H04L 67/02; H04M 1/72552; H04W 4/00; H04W 4/12; H04W 4/14; H04W 4/80; H04W 4/008; H04W 8/18; H04W 88/184
USPC .......................................... 455/466; 709/204
See application file for complete search history.

(56) References Cited

U.S. PATENT DOCUMENTS

| | | |
|---|---|---|
| 2008/0209329 A1 | 8/2008 | DeFranco |
| 2010/0009702 A1 | 1/2010 | James |
| 2011/0078081 A1 | 3/2011 | Pirzadeh |
| 2011/0175879 A1 | 7/2011 | Tanaka |
| 2012/0221421 A1 | 8/2012 | Hammad |
| 2013/0036480 A1 | 2/2013 | Anderson |
| 2013/0085870 A1 | 4/2013 | Seah |
| 2013/0140359 A1 | 6/2013 | Xie |

METHOD AND SYSTEM FOR SHARING DATA BETWEEN TERMINALS

CROSS REFERENCE TO OTHER APPLICATIONS

This application is a continuation of co-pending U.S. patent application Ser. No. 15/005,961, entitled METHOD AND SYSTEM FOR SHARING DATA BETWEEN TERMINALS filed Jan. 25, 2016, which claims priority to People's Republic of China Patent Application No. 201510052265.0, entitled A METHOD AND A DEVICE FOR SHARING DATA, filed Jan. 30, 2015 both of which are incorporated herein by reference for all purposes.

FIELD OF THE INVENTION

The present application relates to a method and a system for sharing data.

BACKGROUND OF THE INVENTION

Currently, if users wish to share data between mobile devices or terminals, the users typically perform the following:

1. Open a terminal; select and duplicate some data provided by a terminal application (also referred to as a terminal app). For example, duplicating content that one is to share and that is included in a piece of information currently can require that the duplicated and shared content support text format only.

2. Open a communication application (also referred to as a communication app) and paste the duplicated data into an information input box of the communication app. The communication app is an app that uses near-distance communication technology to implement communications or an app that uses non-near-distance communication technology to implement communications (such as Laiwang, QQ, WeChat, etc.). "Near-distance communication technology" typically includes Bluetooth technology, infrared data transmission, Wireless Fidelity (Wi-Fi) technology, and near field communication (NFC) technology.

3. Cause the communication app to send data pasted in an information input box to another communication app.

However, the above data-sharing technique is rather limited because of the restrictions on the data format being shared, and is relatively inefficient.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
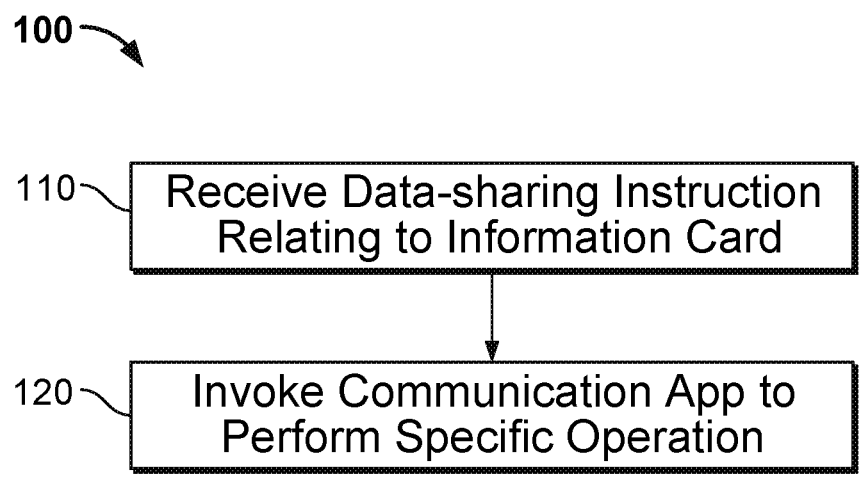
FIG. 1A is a flowchart illustrating an embodiment of a process for sharing data.

FIG. 1A is a flowchart illustrating an embodiment of a process for sharing data. In some embodiments, the process 100 is implemented by a terminal 920 or 930 of FIG. 9. Process 100 comprises:

In 110, an application of the terminal is configured to receive a data-sharing instruction associated with an information card.

The data-sharing instruction can be entered by a user, or the data-sharing instruction can be sent by a server or by a receiving terminal as described below. The "information card" refers to an electronic card, which can be displayed on a display screen of a terminal. The information card data comprises data pertaining to the background of the information card and various kinds of information displayed on the information card (including images and text).

When a terminal having a touchscreen performs operation 110, the data-sharing instruction can, for example, be an instruction input by the user through the touchscreen. For example, the user performs a specific operation vis-à-vis an information card display area corresponding to the information card data that is to be shared to input the data-sharing instruction into the terminal. The operation can be a click operation (such as a single-click or a double-click), or the operation can be a gesture operation (such as a swiping gesture).

In 120, the terminal can invoke a communication app to perform a specific operation. For convenience, this specific operation is to be referred to below as "the specific operation."

In some embodiments, the specific operation includes: transmitting to-be-shared information card data to a receiving terminal, or transmitting an identifier for to-be-shared information card data to a receiving terminal so that the receiving terminal downloads the information card data based on the identifier for the to-be-shared information card data.

The communication app can include: an app that communicates based on near-distance communication technology or an app that communicates based on non-near-distance communication technology (such as text messages, Fetion, Laiwang, QQ, WeChat, etc. that rely on communications networks such as Ethernet or cellular networks). "Near-distance communication technology" includes Bluetooth technology, infrared data transmission or Wireless Fidelity (WiFi) technology, NFC technology, etc. that allows direct point-to-point communication.

In operation 120, the communication app can be invoked to implement the sharing of the information card data after the data-sharing instruction is received. Because great amounts of data having different formats can be shared, the efficiency of the data-sharing process 100 is increased as a result. The efficiency of the data-sharing process 100 is increased because the communication app can be automatically invoked after the data-sharing instruction is received without requiring the communication app to be opened by the user. As a result, in comparison to conventional techniques, the process 100 can save time locating and opening the communication app. In addition, the shared data also can be automatically formatted for the receiving terminal.

Furthermore, conventionally, the shareable data typically is text information or purely image information. However, in the sharing process 100, sharable information cards can include text, images, animations, or any combination thereof. For example, the information card corresponds to information displayed based on a set display style. The display style can include a display area (optional information), display content background (optional information), fields, field layouts (optional information), etc. Regarding text-type fields, the display style can further include text fonts and colors. If the display style includes an image-type field, the display style can further include image formats, sizes, display areas, etc. If the display style includes an animation-type field, the display style can further include animation formats, display areas, etc. The process 100 can achieve a more visually intuitive effect based on an image display form, an animation display form or a combination thereof. Therefore, the process 100 can achieve a sharing that mixes various kinds of information. Moreover, the process 100 can share display styles for information-sharing cards, and have the result that receiving terminals can display information cards based on the display styles of the information cards.

In some embodiments, to-be-shared information card data includes information content in the information card, e.g., time, location, person, event, etc. The to-be-shared information card data can also, in addition to including the information content in the information card, further include information card display styles for indicating the form of display for the information content in the information card.

After completing the sharing of the to-be-shared information card data, an operation can be performed in relation to the data. In some embodiments, the process 100 can further comprise: receiving an operation instruction for the to-be-shared information card data and performing the operation corresponding to this operation instruction. As an example, the operation instructions is sent by the communication app, a device having a near field communication module, or a hypertext transfer protocol (HTTP) interface of a CloudCard app. The format of the shared data can be in any self-defined protocol (e.g., JavaScript Object Notation (JSON), extensible markup language (XML) or other binary format) if the format can be encoded and decoded by the CloudCard app.

In one example, the operation instruction for to-be-shared information card data (abbreviated below as "the information card data") corresponds to an update instruction for the information card data, and the operation to be performed according to this operation instruction can include: invoking a communication app and transmitting the update information for this information card data to a receiving terminal. The update information for the information card data can include volume-increasing update data for the information card data, or the update information for the information card data can be full-volume update data for the information card data. The volume-increasing update data can refer to a corresponding portion of data on the information card that requires updating (e.g., the data that has been changed), and does not include the portion of the data that has not been changed. For example a new line appended to the information card. The full-volume update data can refer to all the data including changed and unchanged data.

In another example, the operation instruction for the information card data corresponds to a delete instruction for the information card data, and the operation to be performed according to this instruction includes: an operation causing the information card data that is locally stored on the receiving terminal to be deleted from the device or hidden from being displayed. In yet another example, when the operation instruction is a recall instruction for the information card data, the operation corresponding to the recall instruction includes sending a recall notice to the receiving terminal. After receiving this recall notice, the receiving terminal can receive an operation to delete or hide the locally stored information card data. The delete operation to delete information card data specified by the delete operation (a part or all of the data in the information card). The hide operation refers to hiding data in the information card specified by the hide operation (a part or all of the data in the information card can be hidden). The format of the delete and hide operations can be configured by the programmer, for example, using JSON, XML, or a binary format because the encoding and decoding of the operation is performed by the CloudCard app. As used herein, "recall" typically refers to the following action: after the sharing user finishes sharing information card data with the sharing recipient user's receiving terminal, the sharing user for one reason or another rescinds the sharing of the information card data.

In another example, the operation instruction for the information card data corresponds to a disable instruction for the information card data, and the operation to be performed according to the disable instruction includes: sending to a server a disable request including an identifier for the receiving terminal (e.g., an IP address of the receiving terminal, the receiving terminal's configuration information, the receiving terminal's communication number, the receiving terminal's user's account information, etc.) so that the server refuses to process information requests that are sent by the receiving terminal associated with the identifier and that are associated with the information card data. For example, if, after the sharing sender user finishes sharing information card data with the sharing recipient user's receiving terminal, the sharing sender user wishes that the sharing recipient user no longer be able to use information card data, the sharing sender user can issue a disable instruction for the information card data.

In some embodiments, when the information card data includes an electronic shopping voucher (e.g., an electronic coupon or electronic movie ticket), the information request associated with the information card data corresponds to a request to use the electronic shopping voucher such as displaying a code, and deducting an amount of stored value from the sharing sender user's account and crediting the amount to the sharing recipient user's account.

Once the information card data is shared, performing various operations on shared information card data, via various processes, is possible. However, conventionally, after the data has been shared, the sharing user cannot control the shared data.

As discussed above, the operation includes transmitting an identifier for the information card to a receiving terminal so that the receiving terminal downloads the information card data based on the identifier. The identifier for the information card is different from the identifier for the receiving terminal. These two identifiers have no relationship. In some embodiments, the receiving terminal downloads the information card data from a server or from the terminal used by the sharing user. When downloading the information card data from a server, the server is informed that the receiving terminal has the right to or is authorized to download the information card data. The identifier for the receiving terminal can be sent to a server so that the server determines whether the receiving terminal has download authority for the information card data based on the identifier for the receiving terminal. In some embodiments, a download-authority identifier is sent to the receiving terminal so that the receiving terminal downloads the information card data based on the download-authority identifier. For example, the receiving terminal includes the download-authority identifier in a data download request and sends the download-authority identifier to a server so that the server learns that the receiving terminal has download authority for the information card data.

In some embodiments, when the executing entity that invoked the communication app to perform a specific operation is an application executing on a terminal (hereinafter referred to as "the terminal app," for example a custom application configured to display information cards), the communication app is invoked to perform a specific operation. The specific operation includes:

after converting the information card data to a data format supported by the terminal app, invoking the communication app to send information card data having a converted data format to the receiving terminal based on a communication protocol supported by the communication app; or after converting the information card data identifier to a data format supported by the terminal app, invoking the communication app to send the information card data identifier having a converted data format to the receiving terminal based on a communication protocol supported by the communication app so that the receiving terminal downloads the information card data based on the identifier.

As an example, when the specific operation includes transmitting the information card data to a receiving terminal, the data can undergo encapsulation twice to generate data packets, and then the encapsulated data packets are transmitted. The first encapsulation can occur before the communication app is invoked. The information card data is encapsulated by the terminal app based on a data packet encapsulation protocol to obtain a first data packet including the information card data. The data packet encapsulation protocol can be JSON, XML or a binary format. The second encapsulation can be performed by invoking the communication app. For example, the communication app can, based on a communication protocol supported by the communication app, encapsulate the first data packet to obtain a second data packet and send the second data packet to a receiving terminal.

In another example, when the specific operation includes transmitting an identifier for the information card to a receiving terminal so that the receiving terminal downloads the information card data based on the identifier, the information card identifier also undergoes encapsulation twice. The first encapsulation can occur before the communication app is invoked. The information card identifier is encapsulated by the terminal app based on a data packet encapsulation protocol to obtain a third data packet including the identifier. The second encapsulation can be performed by invoking the communication app. As an example, the communication app can, based on a communication protocol supported by the communication app, encapsulate the third data packet to obtain a fourth data packet and send the fourth data packet to a receiving terminal.

In some embodiments, when the executing entity for the above first encapsulation is an app (such as an app that provides information cards), the above data packet encapsulation protocol could be a data packet encapsulation protocol supported by the app. This information card data packet encapsulation protocol could be set by the server that provides the app.

A person skilled in the art can understand that if a receiving terminal has installed on itself a terminal app supporting the information card data packet encapsulation protocol and the communication app, the receiving terminal is to perform the following upon receiving, for example, a second data packet: first, the local communication app on the receiving terminal decapsulates the information card data packet based on the communication protocol to obtain a first data packet. Then, a terminal app that supports the information card data packet encapsulation protocol decapsulates the first data packet based on the data packet encapsulation protocol to obtain the information card data.

The decapsulation process for the fourth data packet is a reverse process of the above encapsulation technique and will not be discussed further for conciseness.

In some embodiments, the information card data includes information card-related data. The information card-related data can refer to all data that can be displayed in an electronic card form. The information card-related data, for example, can include but is not limited to the following categories: a unique identifier for the information card, the service type of the information card, the user attributes of the information card, the display title of the information card, descriptive information for the information card, image information associated with the information card, or any combination thereof.

As discussed above, the shareable information card data can include information card display style information to indicate the display of the receiving terminal.

The above information card display style information can be referred to as fields included in the information card.

The above-discussed fields are merely examples. The process 100 covers sharing information card data including the information for many other types of fields. Moreover, the titles and corresponding content for the fields can be defined. For example, the unique identifier for an information card could, for example, be similar to a code for an electronic coupon or to a conversion code used for converting an electronic movie ticket into a real movie ticket. For example, an electronic movie ticket is read by a special ticket reader provided by the theater. The special ticket reader verifies a conversion code on the electronic movie ticket, and if the conversion code is verified, a new ticket is printed and issued. The service type of an information card could be "consumer" or "notification information." User attributes of an information card could, for example, be part or all of the identification card number of the sharing user. The display title of the information card refers to the display title used when displaying the information card on the terminal. Examples of the display title include "Movie Ticket," "Train Ticket," and "Store Coupon." Information card descriptive information typically is a simple introduction to the information card, such as an expiration date for usage and a brief summary of the associated product (such as a movie). Image information associated with the information card could, for example, be an electronic poster of a movie or a photograph of merchandise.

In some embodiments, information cards include: electronic consumption vouchers, electronic tokens, electronic movie tickets, electronic train tickets, electronic coupons, electronic order cards, etc.

In some embodiments, the specific operation includes transmitting the information card data to a receiving terminal, and the information card data is data associated with a certain information card, the communication app is invoked to perform a specific operation that can include: invoking the communication app to transmit the data associated with the information card to the receiving terminal.

In some embodiments, the specific operation includes transmitting the information card data to a receiving terminal, and the information card data is data associated with a certain information card. Transmitting just a portion of the data associated with the information card to the receiving terminal is also possible.

Figure 1B:
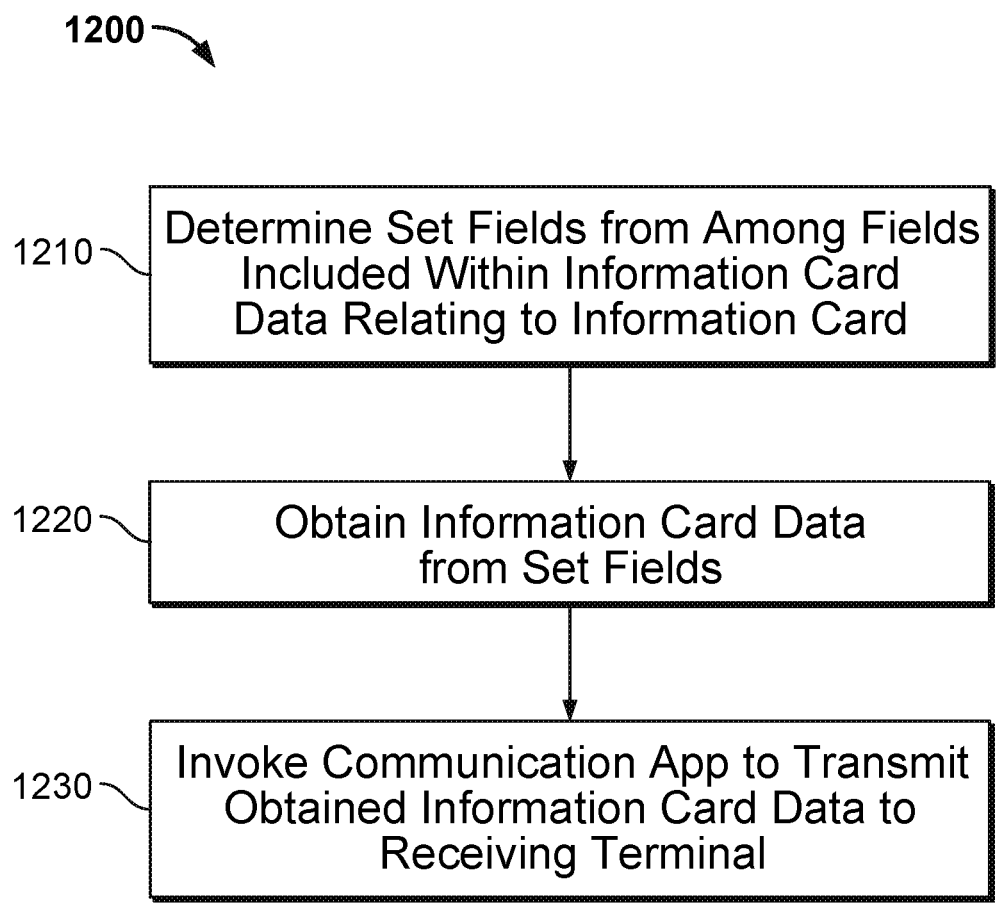
FIG. 1B is a flowchart illustrating an embodiment of a process for invoking a communication app.

FIG. 1B is a flowchart illustrating an embodiment of a process for invoking a communication app. In some embodiments, process 1200 implements operation 120 and includes:

In 1210, the communication application of the terminal can determine set fields from among fields included within the information card data associated with an information card.

In 1220, the communication application of the terminal can obtain information card data from the set fields.

In 1230, the communication application of the terminal can invoke a communication app to transmit the obtained information card data to a receiving terminal.

In an example, after information card data is obtained from the set fields, the terminal can invoke, after processing the obtained information card data, the communication app to transmit the processed information card data to a receiving terminal.

In some embodiments, the processing of the obtained information card data comprises: entering obtained information card data into a set template. For example, the obtained information card data is entered into the template based on the data structure of the template. The processing of the obtained information card data is not limited in the present application to the above embodiments. For example, various types of processing can be performed based on sharing needs. In another example, obtained information can be combined with corresponding designated information.

Typically, the data in set fields can include the unique identifier for the information card. The data in the set fields can additionally include the following: the service type of the information card, the user attributes of the information card, the display title of the information card, descriptive information for the information card, image information associated with the information card, the display style of the information card, or any combination thereof.

In some embodiments, when the specific operation includes transmitting an identifier for the information card to a receiving terminal so that the receiving terminal downloads the information card data based on the identifier and the information card data is for a certain information card, another embodiment of operation 120 is performed.

Figure 1C:
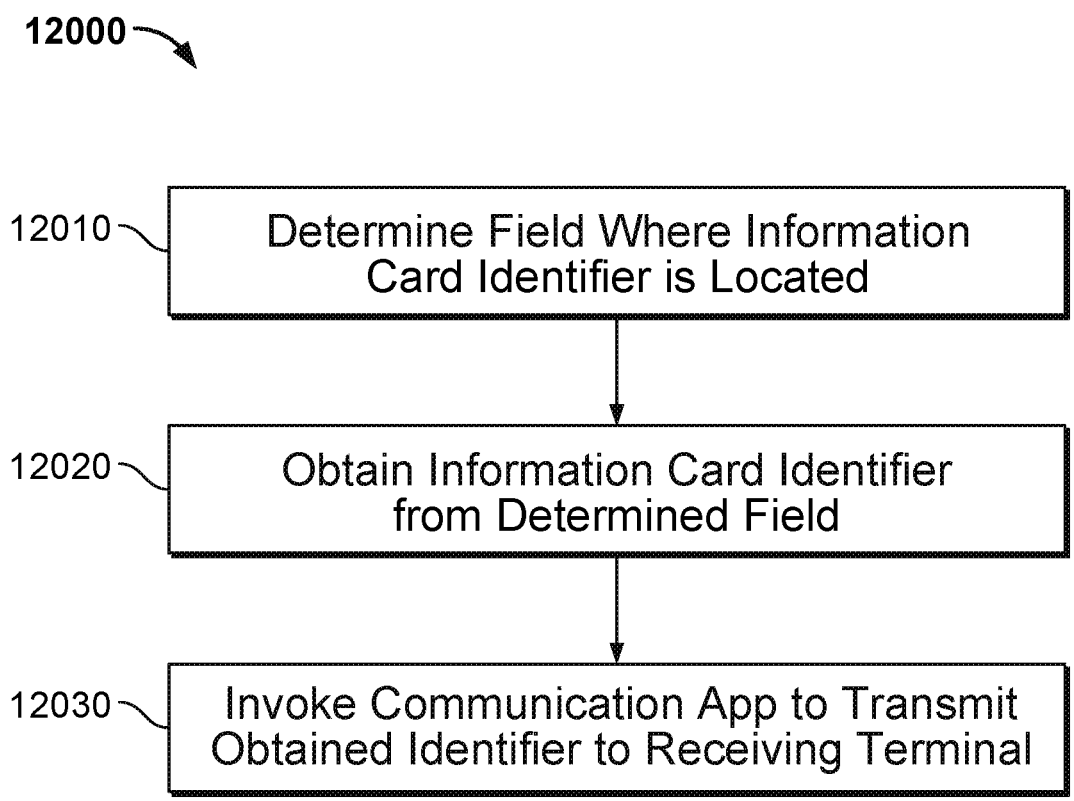
FIG. 1C is a flowchart illustrating another embodiment of a process for invoking a communication app.

FIG. 1C is a flowchart illustrating another embodiment of a process for invoking a communication app. In some embodiments, process 12000 is another implementation of operation 120 and includes:

In 12010, the communication application of the terminal can determine a field where an information card identifier is located from among fields included in related data associated with an information card.

In 12020, the communication application of the terminal can obtain the information card identifier from the determined field.

In 12030, the communication application of the terminal can invoke the communication app to transmit the obtained identifier to a receiving terminal so that the receiving terminal downloads the information card based on the information card identifier.

In some embodiments, the data-sharing instruction can be triggered or initiated by a user using a trigger entry. For example, prior to operation 110, process 100 can further include: displaying a trigger entry for sharing data on an information card interface. For example, operation 110 can include: the terminal receives a data-sharing instruction triggered by a user using a trigger entry displayed on an information card interface. For example, the trigger entry corresponds to an object displayed at the bottom of the information card for the operation of the user. For example, the object corresponds to a button or link embedded in the card. A description, a title, or the type of data to be shared after the triggering of the trigger entry's functions (e.g., when the user clicks on the button or the link) could be displayed in an area where the trigger entry is located to guide the user.

In some embodiments, one or more data sharing trigger entries can exist. When the data-sharing trigger entry includes multiple trigger entries, each trigger entry can correspond to a different data-sharing instruction, and each data-sharing instruction indicates the data that is to be shared.

In some embodiments, the data-sharing trigger entry also indicates the manner in which the data is shared. Sharing techniques include, for example, sharing through text messages, sharing through WeChat, sharing through microblogging, sharing through WeChat friend groups, etc. When a data-sharing trigger entry is also used to indicate how data is shared, operation 120 can include invoking a communication app that supports a specific data sharing technique to perform a specific operation. The specific sharing technique is the sharing technique indicated by the trigger entry corresponding to the data-sharing instruction. The trigger entry corresponding to the data-sharing instruction is the entry that triggers the generation of the data-sharing instruction.

The executing entity for each operation in process 100 can be the same device, or different devices can serve as the executing entity for the process.

Figure 2:
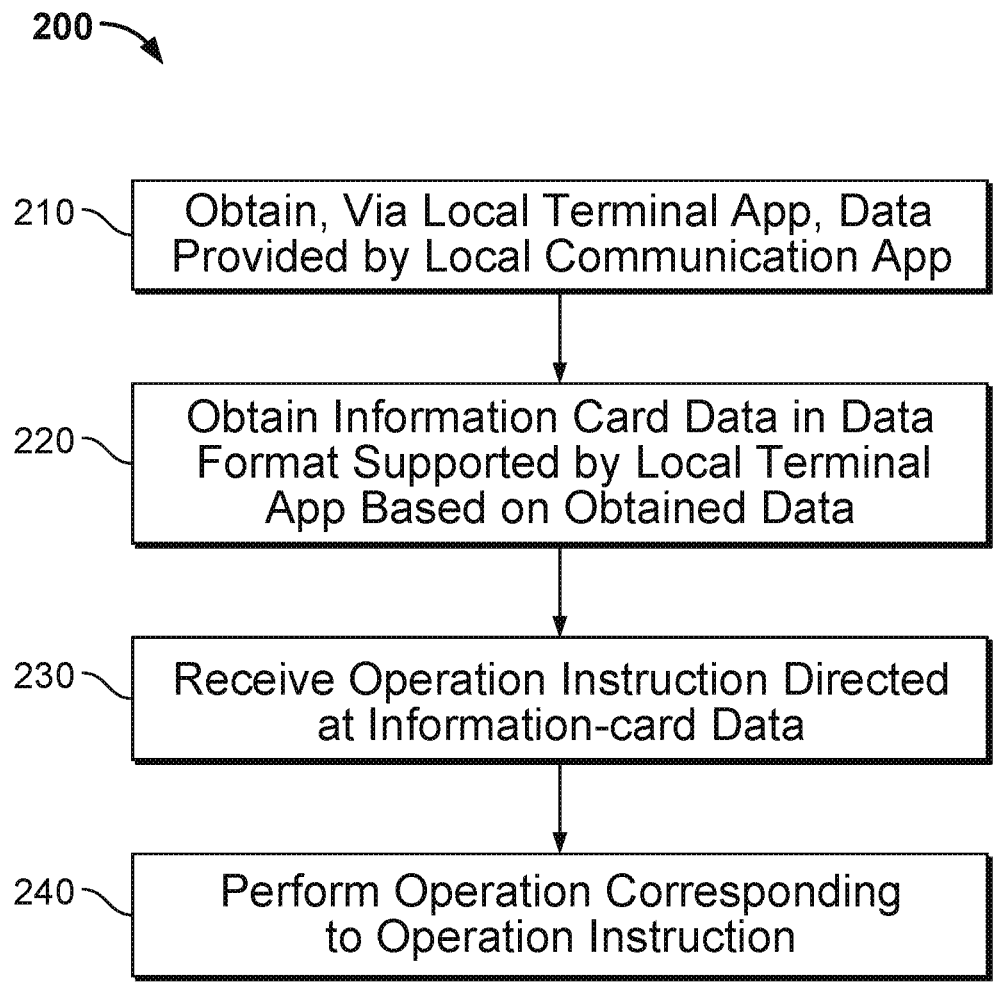
FIG. 2 is a flowchart illustrating another embodiment of a process for sharing data.

FIG. 2 is a flowchart illustrating another embodiment of a process for sharing data. In some embodiments, the process 200 is implemented by a terminal 920 or 930 of FIG. 9 and comprises:

Process 200 corresponds to the process 100 of FIG. 1A and increases the efficiency of sharing data.

In 210, the communication application of the terminal can obtain, via a local terminal app, data provided by a local communication app. The local communication app issues a request to communicate with other terminals, to obtain information card data from an application of another terminal, e.g., email, WeChat, etc. The local terminal app refers to an application that uses a local communication application to obtain information card data and to display the obtained data. In other words, first, the local communication application obtains information card data from the local terminal app, then displays the obtained information card data on the local terminal and allows other operations.

For example, the terminal invokes a terminal communication app to send data to another communication app that installed in another terminal. In another example, the terminal invokes a terminal communication app to receive data from another communication app that is installed on another terminal.

A process similar to process 100 of FIG. 1A can be used to invoke a terminal app to send data.

In 220, the communication application of the terminal can obtain information card data according to a data format supported by the local terminal app based on the obtained data.

The data obtained by performing operation 210 can directly undergo a format conversion of the information card data in a data format supported by the local terminal app.

In another example, when the data obtained by performing operation 210 includes the identifier for the information card data, the information card data that is in a data format supported by the local terminal app and that corresponds to the identifier can be downloaded based on the identifier. In yet another example, the information card data corresponding to the identifier can be downloaded and the format of the downloaded information card data can be converted into a format supported by the local terminal app.

The above-described process 200 can further support an operation directed at the information card data. In some embodiments, after obtaining information card data, the process further includes:

In 230, the communication application of the terminal can receive an operation instruction directed at the information card data.

In 240, the communication application of the terminal can perform an operation corresponding to the operation instruction.

In some embodiments, the operation includes: updating the information card data based on update information for the information card data, deleting or hiding locally saved information card data, displaying a recall notice associated with the information card data, or any combination thereof.

In some embodiments, the displaying of the notice is to inform the user who is using the local terminal app that the information card data has been recalled and that the user can no longer exercise rights associated with the information card data, such as sending information requests associated with the information card data.

In some embodiments, if a server permits only terminals that have information card data download rights to download information card data, process 200 includes an additional operation to facilitate the downloading of the information card data by a receiving terminal: the terminal receives a download-authority identifier sent by a sending terminal. The download-authority identifier can serve as a basis for: when the information card data is to be subsequently downloaded, the download-authority identifier is sent to the server to let the server know that the local terminal app has obtained download authority for the information card data. The terminal, upon receiving the download-authority identifier, obtains the information card data provided by the server.

The executing entity for each operation in process 200 can be the same device, or different devices can serve as the executing entity for process 200.

In an example of operation 210, the terminal provides the local communication app that sends data to the local terminal app by:

In a first operation, App A, which is configured to listen for messages on a specific communication port, receives a notice broadcast sent by the local communication app after the local communication app receives the data. For example, many communication apps or devices having near field communication modules can broadcast when new data are received after a broadcast receiver is configured to listen for broadcasts.

Since the data can be sent by App A, which is installed on the sending terminal, the communication app is invoked. The data can include an identifier for the App A.

In a second operation, App A obtains the App A identifier from the notice and determines that the data corresponding to the notice can be used by App A itself.

In a third operation, App A obtains the data provided by the local communication app. App A can, for example, request that the local communication app send the data, or the data can be downloaded directly from the local communication app. For example, App A listens for a broadcast that is sent in response to the communication app receiving a new message, and App A can analyze the broadcast to obtain the data.

Figure 3A:
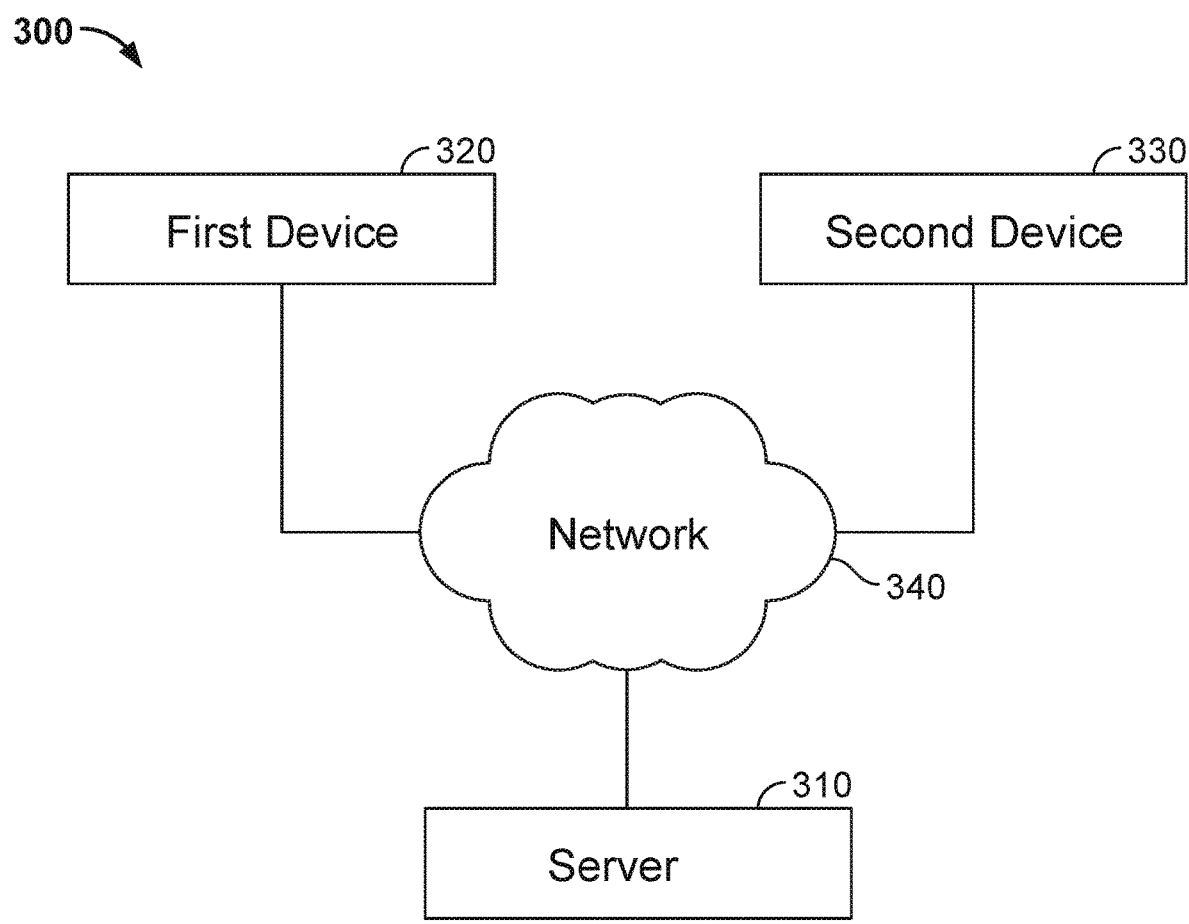
FIG. 3A is a diagram illustrating an example of a system for sharing data.

FIG. 3A is a diagram illustrating an example of a system for sharing data. In some embodiments, the system 300 comprises: a server 310, a first device 320, and a second device 330, which all are connected via a network 340.

In order to provide an explanation of process 100 of FIG. 1 and process 200 of FIG. 2, the system 300 is provided.

For example, in system 300, a third party communication tool common on mobile devices 320 and 330 (i.e., an app that employs non-near-distance communication technology to communicate, such as text messages, Laiwang, or QQ) can be used as the data transmission channel. Various data transmissions and displays are implemented in a negotiated data packet format between mobile devices 320 and 330.

In one example, an app that can acquire and display information cards for users is employed. In this example, the app is known as a card/voucher center because the app manages information card-based vouchers.

When a first device 320 wishes to share an information card with a second device 330 (i.e., the equivalent of "the information card data" in sharing process 100 of FIG. 1A and process 200 of FIG. 2), the card/voucher center on the first device 320 creates a data packet from a to-be-shared information card based on a negotiated protocol.

The card/voucher center on the first device 320 invokes a third party communication tool (such as an application programming interface (API) or library function supported by the third party) to send the information card data to the second device 330. The third party communication tool refers to a communication app.

Upon receiving the data packet, the third party communication tool on the second device 330 issues a broadcast announcing that the data packet has arrived.

The card/voucher center on the second device 330 takes the data packet based on the negotiated protocol and analyzes the data packet according to the application's needs. Moreover, the second device 330 stores and displays the data of the data packet.

After the information card has been shared, the first device 320 and the second device 330 both have the same information card. When the first device 320 revises the information card, the updated information is uploaded to the server 310. The second device 330 then acquires the updated information card data from the server 310 and achieves information synchronization for the same information card on multiple devices 320 and 330.

Figure 3B:
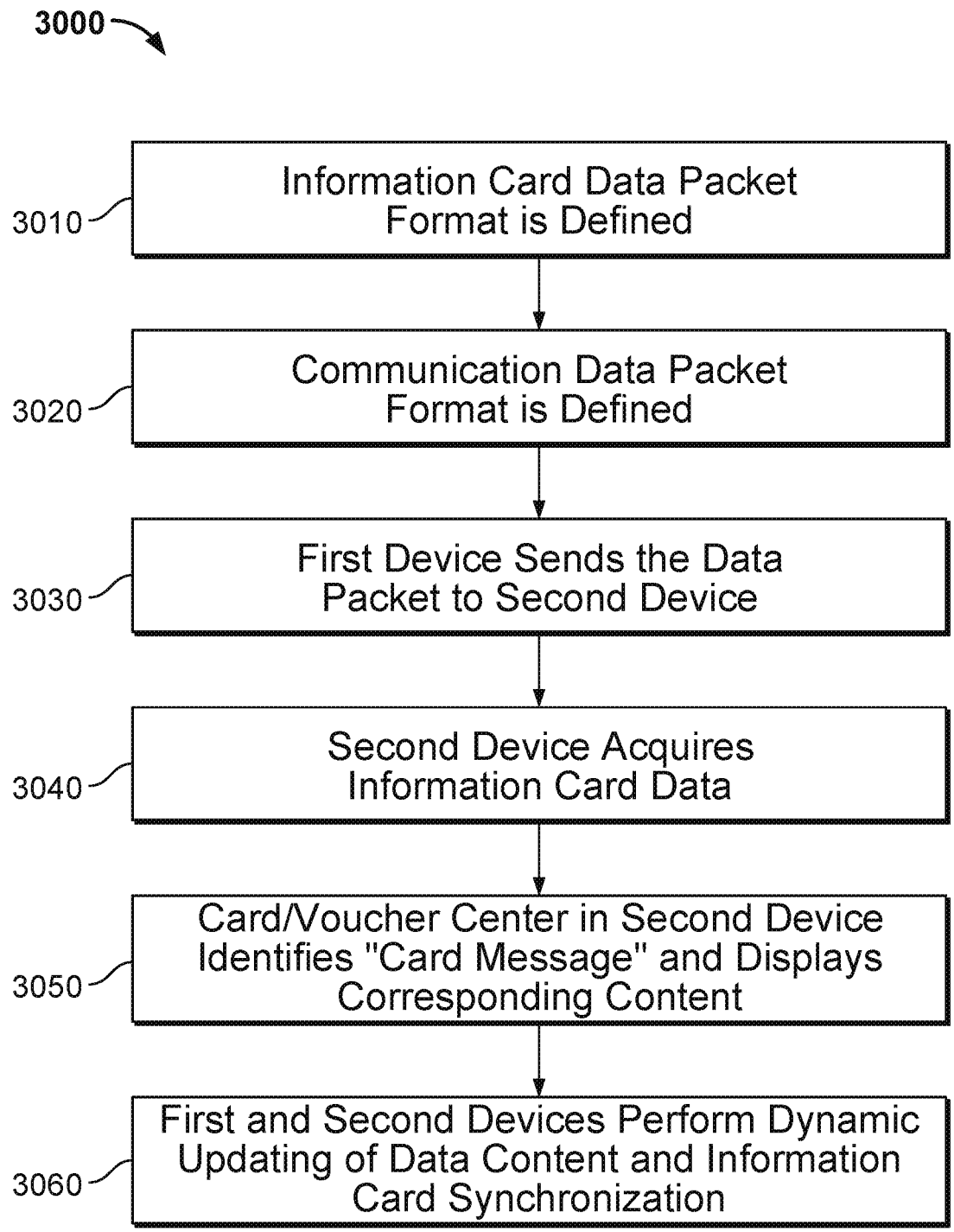
FIG. 3B is a diagram illustrating an example of a process for sharing data.

FIG. 3B is a diagram illustrating an example of a process for sharing data. In some embodiments, the process 3000 is implemented by a first device 320 and a second device 330 of FIG. 3A. Process 3000 comprises:

In 3010, an information card data packet format is defined.

First, a model definition is made or created for the information card data (i.e., the above information card-related data).

For example, basic fields, business fields, and extension fields are defined for the information card data, as follows:
[card_id]: TEXT
[service_id]: TEXT
[type]: TEXT
[ownerid]: TEXT
[title]: TEXT
[logourl]: TEXT
[content]: TEXT
[location]: TEXT
[status]: TEXT DEFAULT '1'
[biz_status]: INTEGER DEFAULT '1'
[sync_status]: TEXT
[occurtime]: INTEGER
[gmtexpired]: INTEGER
[gmt_modify]: INTEGER
[gmt_create]: INTEGER
[other_ext]: TEXT
[local_category]: INTEGER DEFAULT '2'
[local_createtime]: INTEGER
[local_modifydate]: INTEGER
[arg0]: INTEGER
[arg1]: TEXT
[arg2]: TEXT In the above definition, the symbols "[ ]" indicate a field. The content within the symbols indicates a feature of the data stored in the field. For example, the content "card id" indicates the identifier for an information card, and "[card_id]" indicates the field where the identifier is located.

As shown above, the business fields include two fields: "content" and "biz status." "arg0" through "arg2" are extended fields. The remaining fields are basic fields. The format for "content" can be based on a JavaScript Object Notation (JSON) format.

In the above fields, "card id" corresponds to an identifier for an information card. When a communication packet is defined, the communication packet can include the "card id" only. Each information card can have a "service id" indicating service type. Information cards that have the same "service id" share the same display level. "owner id" corresponds to a user attribute for the information card. "title" corresponds to the title when the card is displayed.

Figure 4:
FIG. 4 is a diagram illustrating an example of a movie ticket.

In some embodiments, information card data is the above data fields. FIG. 4 is a diagram illustrating an example of the information card data of a movie ticket. For example, the specific data for a movie card/voucher of FIG. 4 is shown in the table below:

| | |
|---|---|
| card_id | D221S24GX3NMJYIJHXCM |
| service_id | CXA8B16D6GRJFQ3H2IEK |
| ownerid | 544907768684xxxx |
| title | Don't Go Breaking My Heart 2 |
| logourl | http://img1.tbcdn.cn/bao/uploaded//i1/TB1fy5lGFXXXXaZXVXXXXXXXXXX_.jpg |
| content | {"partnerName": "Wangpiao.com", "seatCount": "2", "hall": "hall number 2", "serial number": "110455400", "seatInfo": "row 8 seat 6\|row 8 seat 7", "cinemaName": "China Film Cinema-Xixi In City Mall, Hangzhou", "showTime": "20:15:00", "showDate": "2015 Feb. 14", "cinemaPhone": "0571-88680672", "tip":"1; Ticket pick-up location: Movie theater (ticket vending machine or theater front counter; the text message is authoritative). <br/>2: How to pick up ticket: Enter conversion information as prompted at the seller's ticketing machine or at the theater front counter; the ticket will thereupon be issued. <br/>3: If you have questions concerning ticket pick-up, please call the seller's telephone number for information. <br/>4: Because of the particularities of tickets with seat selection, after a ticket is successfully issued, seating may not be modified and the purchase may not be refunded. Please pay attention to seating, showing, and time, and arrive promptly to watch the film; avoid waste." , "version": "Mandarin 2D", "duration": "113", |

|  |  |
|---|---|
|  | "showName": "Don't Go Breaking My Heart 2", "partnerPhone": "400-678-2005", "poster": "http://img1.tbcdn.en/bao/uploaded//i1/TB1fy5lGFXXXXaZXVXXXXXXXXXX_.jpg", "cinemaAddress": "Xixi In City Mall, 3rd Floor, 1 Wuchang Avenue", "Ticket verification code": "354042"} |
| sync_status | Y |

In 3020, a communication data packet format is defined.

The card/voucher center in the first device extracts data from the required fields included in the information card data and organizes the data based on the agreed protocol to generate a data packet.

For example, the required fields include: [card_id]^[service_id]^[title]^[ownerid]^[content]. Thus, using the above table as an example, the card/voucher center can extract data from the fields and organize the fields in the following form:

D221S24GX3NMIYIJHXCM^CXA8B16D6GRJFQ3H2IEK^544907768684xxx x^Don't Go Breaking My Heart 2^{"partnerName": "Wangpiao.com" . . . }

Furthermore, the data in the above form can be coded using base 64 and then encrypted (code 123456) using Advanced Encryption Standard (AES) and compressed to obtain a data packet. (Let us assume that the data packet is called "card message.") For example, after the encryption, the data packet can be expressed with the following characters:

U2FsdGVkX1+rR8dSy1xFVkTE+WzaJwaG6i7G79osQhhLAUQmwuEcffN3oZAcmJu8FiucL64el3voB0Z0jm//daEwYZD7LO8c7T0ACcDpckx718IkG5WKCt05Yp/XVYRBI vB28HD+Df48shKrpJhbdJw9r1U0A55gACPRHJcLgYPzDc41pXZdqz46rDbPUGf8wqp1VsHqh JoumVsfd/NlgQ==o A data packet is formed through the above processing, and the data in the data packet undergoes encryption processing to ensure data security.

For the processing process described above, the following points are clarified:

In one aspect, required fields can be selected based on the app status. For example, the "[card_id]" field can be selected. After receiving the "[card_id]" field, the second device downloads the data in other fields of the information card based on the "[card_id]" field.

In another aspect, the sending protocol format is not limited to the above format. The sending protocol format can also be readable based on JSON, Extensible Markup Language (XML), or another self-defined format.

In yet another aspect, forms of encryption are not limited to the above base 64+AES form. The forms of encryption can be other appropriate encryption techniques.

In yet another aspect, if data length is excessive, a compression technique can be used to compress the data.

In yet another aspect, if no security risk is involved in the sent data, then direct, plain-text sending can be used.

In yet another aspect, if the data is to be sent to a social-networking platform, a data packing technique can include an image+link approach, images being the visual form of the information card (as shown in FIG. 4) and the link can be a special form of a uniform resource identifier (URI).

For example, the URI could make use of the following code:

lifecard://lifecard.app/carddata?message={ card_message}

In the card/voucher center app of the first device, an activity that can process this type of URI can be defined. For example, the activity could be defined as follows:

```
<activity
    android:name="com.myexample.myapplication.MainActivity"
    android:label="@string/app_name" >
    <intent-filter>
        <action android:name="android.intent.action.MAIN" />
        <category
        android:name="android.intent.category.LAUNCHER" />
    </intent-filter>
    <intent-filter>
        <action android:name="android.intent.action.VIEW" />
        <category
        android:name="android.intent.category.DEFAULT" />
        <category
        android:name="android.intent.category.BROWSABLE" />
        <data
            android:host="lifecard.app"
            android:pathPrefix="/carddata"
            android:scheme="lifecard" />
    </intent-filter>
</activity>
```

Based on the defined activity, when a user clicks an image on a social-networking platform (such as, for example, microblogging or WeChat), the URI that is bound to the image is to be triggered. Moreover, the URI is to trigger the activity that has been defined. In some embodiments, the communication apps are to show the message URI, and the URI is generated by the CloudCard app, so some information can be appended to the URI. The activity is configured to obtain the "card message" in the following manner:

```
Intent viewIntent = getIntent( );
String action = viewIntent.getAction( );
if (Intent.ACTION_VIEW.equals(action)) {
    URI URI = viewIntent.getData( );
    if (URI != null) {
        String card_message =
        URI.getQueryParameter("message");
        // other operation
    }
}
```

In summary, in some embodiments, the data packet protocol is defined by the application developer. The first and second devices can be configured to generate and analyze data packets based on an agreed data-packet protocol.

In 3030, a first device sends the data packet to a second device.

In one example, the card/voucher center in the first device invokes a third party communication tool to send a data packet obtained by organizing data (i.e., the above "card message").

For example, the "card message" can be sent via a text message according to the following code:

```
Intent intent= new Intent(Intent.ACTION_SENDTO,
    URI.parse("smsto:"+phoneNumber));
    intent.putExtra("sms_body", card_message);
    startActivity(intent);
```

The "phoneNumber" in the text message corresponds to the mobile phone number on the second device.

Figure 5:
FIG. 5 is a diagram illustrating an example of information card data.

FIG. 5 is a diagram illustrating an example of information card data. In this example, the first device is capable of having the user autonomously select receivers of the information card data. For example, the user autonomously selects text message receiver numbers.

When the technique is adopted of sending the card message in a text message, a silent sending technique can be selected. Using this silent sending technique, the specific content of the card message is not to be displayed in the text messages of the first device and the second device. This silent sending technique is more secure. In one example, one can use the following code to implement selection of the silent sending technique for sending the card message in a text message.

```
SmsManager smsm = SmsManager.getDefault( );
smsm.sendDataMessage(phoneNumber, null, port, card_message, null,
null);
```

The "port" is the agreed upon text-message receiving port. For example, the port can be set to 1000.

In some embodiments, the third party communication tool is not limited to text messages. The third party communication tool can also be WeChat, QQ, microblogging, Wanglai, etc. In some embodiments, the tool is to be installed on both the first device and the second device, and the card/voucher center invokes the third party communication tool to send data or obtain data from the third party communication tool.

In some embodiments, a social-networking platform app is configured to send data to designated friends ("Friends"), a group (such as WeChat's Group Chat or Laiwang's "gathering together"), dynamic recipients (such as WeChat's Circle of Friends or Laiwang's "dynamic"), or any combination thereof.

In 3040, a second device acquires information card data.

Figure 6:
FIG. 6 is a diagram illustrating an example of received text message content.

When the third party communication tool of the second device receives a card message, the third party communication tool issues a new message providing notice of the received card message to the card/voucher center. After the card/voucher center of the second device obtains the notice, the card/voucher center accesses the data from the third party communication tool. Using the example of a third party communication corresponding to text messaging, the card/voucher center, upon detecting an SMS_RECEIVED broadcast, accesses a card message from the text message content as shown in FIG. 6. FIG. 6 is a diagram illustrating an example of received text message content. The code whereby the card/voucher center accesses the text message content is as follows:

```
Object[ ] pduses= (Object[ ])intent.getExtras( ).get("pdus");
for(Object pdus: pduses){
    byte[ ] pdusmessage = (byte[ ])pdus;
    SmsMessage sms = SmsMessage.createFromPdu(pdusmessage);
    String content = sms.getMessageBody( );
}
```

The "content" in "String content" corresponds to the "card message." The information card data can be obtained by performing the reverse of the operations described in operation 3010 of FIG. 3B.

Furthermore, if the first device sends only the "card id," then the card/voucher center on the second device is to request, based on the "card id," other data for the information card from the server.

Furthermore, if the "card message" is sent through a third party communication tool other than text messaging, this operation corresponds to accessing the "card message" from the third party communication tool.

When a "card message" is sent using a social-networking platform, the first and second social network sharing techniques described in operation 3030 of FIG. 3B are restricted in that the card/voucher center may not be able to gain permission from a third party communication tool to access information content received by the third party communication tool. However, whenever a new message arrives at the third party communication tool, a notice including the "card message" can be sent to the notification center of the operating system. The card/voucher center is configured to access the "card message" from the notification center. As for the third social-networking sharing technique described in operation 3030 of FIG. 3B, a "card message" can be accessed through a URI, as described in operation 3020 of FIG. 3B.

In 3050, a card/voucher center in the second device identifies the "card message" and displays the corresponding content.

As of operation 3040 of FIG. 3B above, the card/voucher center on the second device had already received the data in the "card message." The second device then stores the data into a local data storage and presents this data visually. An example of the presentation of the information card is shown in FIG. 4.

In 3060, the first and second devices perform a dynamic updating of data content and information card synchronization.

The information card data is stored on both the first and second devices. When the information card data is updated, both devices can send a request including "card id" and "gmt modify" to the server to obtain information card update data. "gmt modify" corresponds to the local information card update time on the device where the information card is stored.

If the first device is the original holder of the information card, then, after the first device has shared the information card data with the second device, a third device, etc., the user can set the "[sync_status]" field described above to "d" (delete) by clicking the "Delete" button for information card settings that are displayed on the first device. Upon setting the "[sync_status]" field described above to "d", the current status of the field is to be synchronized by the server. When other devices subsequently request updates of the information card data, the server is to detect the status of the field and instruct the card/voucher center in other devices to delete the local information card data from the devices. Similarly, a "Rescind Sharing" button can also be set up on the information card displayed on the first device. By clicking the "Rescind Sharing" button, the user can achieve the goal of deleting local information card data from other devices.

Similarly, a "Disable Sync Function" button can also be set up on the information card displayed on the first device. By clicking the "Disable Sync Function" button that is set up on the information card displayed on the first device, the user can send a disable sync notification to the server. When another device subsequently updates the information card data, the server is to reject requests, sent by the card/voucher center of the other device, to acquire update data for the information card based on an identifier contained in the disable sync notification. Thus, the other device cannot acquire the update data.

In some embodiments, another device can send the disable sync notification. In some embodiments, another device can synchronize the status of the "[sync_status]" field with the server.

In some embodiments, communication between devices does not need to be forwarded through a server. For example, the first device can directly send information card update data through a third party tool to the second device, the third device, etc.

Furthermore, the first device sends information card data to the second device. The second device can display this information card data without being subjected to other treatment. Many situations exist where the first device sends the information card data to the second device. For example, the first device only provides the second device user with a piece of information. For example, a first user of the first device tells the second user of the second device: I have this logistics information card; I bought this logistics information card, and the logistics information card has already been delivered to a place, etc.

The sharing of the information card data between the first and second devices is based on a third party communication tool, which is usually stable and reliable and does not rely on special hardware.

The card/voucher center invokes the third party communication tool to send and access data packets. The process 3000 is faster than the conventional process and entails a simpler process flow. The invocation of the third party communication tool process is not constrained by distance, and the invocation of the third party communication tool process supports diverse data formats and is not limited to just text and documents. The invocation of the third party communication tool process provides a more convenient approach to cross-device data sharing by applications.

Multi-device updating can be performed after the data is shared.

The data sharer can still have some control rights after sharing the data, e.g., retrieve, delete, modify, and disable.

This sharing of the data includes but is not limited to the sharing of information card data. Data of any form can be shared using the technology provided by process 3000.

Figure 7:
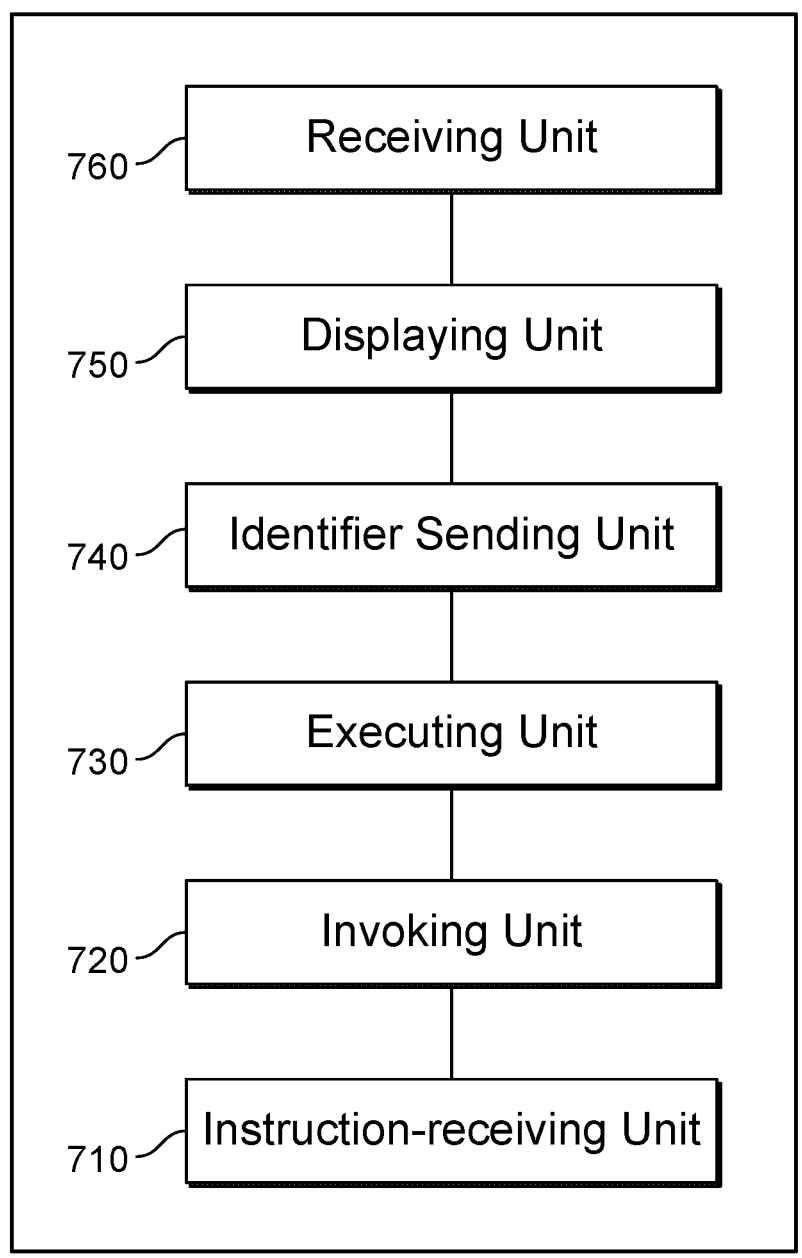
FIG. 7 is a structural diagram illustrating an embodiment of a system for sharing data.

FIG. 7 is a structural diagram illustrating an embodiment of a system for sharing data. In some embodiments, the device 700 is configured to implement process 100 of FIG. 1A and comprises: an instruction-receiving unit 710, an invoking unit 720, an executing unit 730, an identifier sending unit 740, a displaying unit 750, and a receiving unit 760.

In some embodiments, the instruction-receiving unit 710 is configured to receive a data-sharing instruction associated with an information card.

In some embodiments, the invoking unit 720 is configured to invoke a communication app (abbreviated as "the communication app") to perform a specific operation. The specific operation includes: transmitting to-be-shared information card data (abbreviated as "the information card data") to a receiving terminal, or transmitting an identifier for the information card to a receiving terminal so that the receiving terminal downloads the information card data based on the identifier.

In some embodiments, the instruction-receiving unit 710 is further configured to receive an operation instruction for the information card data after the invoking unit 720 invokes the communication app to perform the specific operation.

In some embodiments, the executing unit 730 is configured to perform the operation corresponding to the operation instruction that was received by the instruction-receiving unit 710.

In some embodiments, the operation corresponding to the operation instruction includes: invoking the communication app to transmit update information associated with the information card data to the receiving terminal, causing an operation to delete or hide the information card data stored locally on the receiving terminal, sending to a server a disable request containing an identifier for the receiving terminal so that the server refuses to process information requests that are sent by the receiving terminal and that are associated with the information card data, sending a recall notice to the receiving terminal, or any combination thereof.

In some embodiments, the identifier sending unit 740 is configured to send the identifier for the receiving terminal to a server so that the server determines that the receiving terminal has download authority for the information card data based on the identifier for the receiving terminal.

In some embodiments, when the specific operation includes: transmitting an identifier for the information card to a receiving terminal so that, when the receiving terminal downloads the information card data based on the identifier, the system 700 further includes the identifier sending unit 740. This identifier sending unit 740 is further configured to send the download-authority identifier to the receiving terminal so that the receiving terminal downloads the information card data based on the download-authority identifier.

In some embodiments, when the specific operation includes transmitting to-be-shared information card data to a receiving terminal, the invoking unit 720 is further configured to:

after converting the information card data to a data format supported by the terminal app, invoke the communication app to perform: sending the information card data with a data format that has been converted to the receiving terminal based on a communication protocol supported by the communication app; or after converting the identifier to a data format supported by the terminal app, invoke the communication app to perform: sending the identifier with a data format that has been converted to the receiving terminal based on a communication protocol supported by the communication app so that the receiving terminal downloads the information card data based on the identifier.

In some embodiments, the displaying unit 750 is configured to display a data-sharing trigger entry on the information card interface prior to receiving a data-sharing instruction for the information card.

In some embodiments, the receiving unit 760 is configured to receive a data-sharing instruction triggered by the user through the trigger entry.

In some embodiments, the data-sharing trigger entry comprises one or more trigger entries. When the data-sharing trigger entry includes multiple trigger entries, each trigger entry corresponds to a different data-sharing instruction, and each data-sharing instruction indicates the data that is to be shared.

In some embodiments, when a trigger entry is used to indicate how data is shared, the invoking unit 720 is further configured to invoke a communication app that supports a specific data sharing technique to perform a specific operation. The specific sharing technique is the sharing technique indicated by the trigger entry corresponding to the data-sharing instruction.

In some embodiments, when the specific operation includes transmitting to-be-shared information card data to a receiving terminal, the invoking unit 720 is further configured to invoke the communication app to transmit the information card data of the information card to the receiving terminal.

In some embodiments, when the specific operation includes transmitting to-be-shared information card data to a receiving terminal, the invoking unit 720 is configured to: determine set fields among the fields included in the information data of the information card, and either a) obtain information card data from the set fields, and invoke the communication app to transmit the obtained information card data to a receiving terminal; or b) obtain information card data from the set fields, process the obtained information card data, and invoke the communication app to transmit the processed information card data to a receiving terminal.

In some embodiments, the data in the set fields includes the unique identifier for the information card.

In some embodiments, the data in set fields includes data from the following categories: the service type of the information card, the user attributes of the information card, the display title of the information card, descriptive information for the information card, image information associated with the information card, or any combination thereof.

In some embodiments, when a specific operation includes transmitting the identifier for the information card to a receiving terminal so that the receiving terminal downloads the information card data based on the identifier, the invoking unit 720 is configured to: determine the field in which is located the identifier from the fields included within the related data of the information card, obtain the identifier from the field that was determined, and invoke the communication app to transmit the obtained identifier to a receiving terminal so that the receiving terminal downloads the information card data based on the identifier.

With system 700, the system 700 can invoke a communication app to implement sharing information card data after a data-sharing instruction is received. The efficiency of the data-sharing process is increased as a result.

Furthermore, conventional shareable data typically is text information or purely image information. However, with the sharing technique performed by system 700, sharing information cards is possible. The information included on these cards is not limited to text or images, but can also include combinations of text and images, animations, and other information in multiple formats. For example, the information card includes information displayed based on a set display style. The display style can include a display area (optional information), a display content background (optional information), fields, field layouts (optional information), etc. As for text-type fields, the text-type fields can further include text fonts and colors. If the display style is an image-type field, the image-type field can further include image formats, sizes, display areas, etc. If the display style is an animation-type field, the display style can further include animation formats, display areas, etc. By using image display forms, animation display forms, or a combination thereof, a more visually intuitive effect can be achieved. Therefore, sharing that mixes many kinds of information can be achieved. Moreover, display styles for information-sharing cards can be shared, with the result that the receiving terminals can display information cards based on the display styles of the information cards.

In some embodiments, to-be-shared information card data includes the information content in the information card, e.g., time, location, person, event, etc. The to-be-shared information card data can also, in addition to including the information content in the information card, further include information card display styles for indicating the form of display for the information content in the information card.

Figure 8:
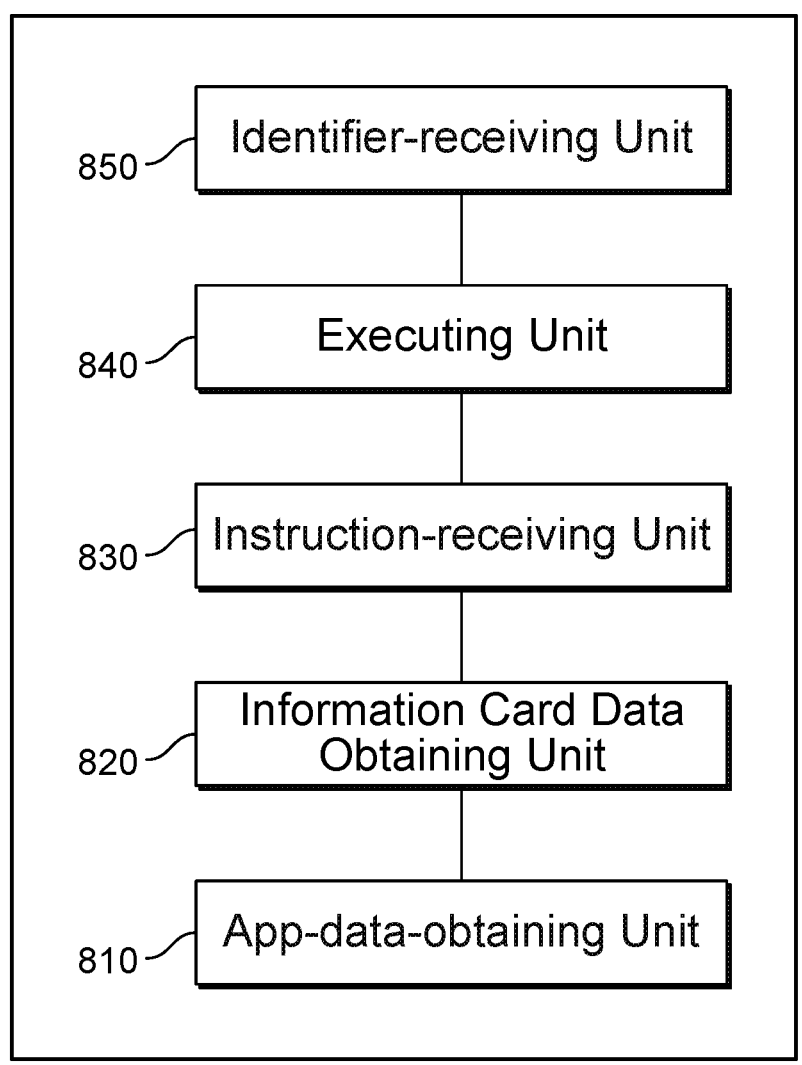
FIG. 8 is a structural diagram illustrating another embodiment of a system for sharing data.

FIG. 8 is a structural diagram illustrating another embodiment of a system for sharing data. In some embodiments, the system 800 is configured to implement process 200 of FIG. 2 and comprises: an app-data-obtaining unit 810, an information card data obtaining unit 820, an instruction-receiving unit 830, an executing unit 840, and an identifier-receiving unit 850.

In some embodiments, the app-data-obtaining unit 810 is configured to obtain data provided by a local communication app (hereinafter referred to as "the data"). In some embodiments, the data was sent to the system 800 by a sending terminal app invoking a sending terminal communication app.

In some embodiments, the information card data obtaining unit 820 is configured to obtain information card data (hereinafter referred to as "the information card data") in a data format supported by the system 800 based on the data obtained by the app-data-obtaining unit 810.

In some embodiments, the instruction-receiving unit 830 is configured to receive an operation instruction for the information card data after the information card data obtaining unit 820 obtains the information card data.

In some embodiments, the executing unit 840 is configured to perform the operation corresponding to the operation instruction received by the instruction-receiving unit 830.

In some embodiments, the operation includes: updating the information card data based on update information for the information card data, deleting or hiding the information card data that is stored locally on the system 800, displaying a recall notice associated with the information card data, or any combination thereof.

In some embodiments, when the data is an identifier for the information card data, the information card data obtaining unit 820 downloads information card data that corresponds to the information card identifier and with a data format that is supported by the system 800, or downloads information card data that corresponds to the information card identifier and processes the format of the downloaded information card data into a data format supported by the system 800.

In some embodiments, the identifier-receiving unit 850 is configured to receive a download-authority identifier sent by a sending terminal. The information card data obtaining unit 820 can send the download-authority identifier to a server to obtain information card data that is provided by the server based on the download-authority identifier and that has a data format supported by the system 800.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple subunits.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Figure 9:
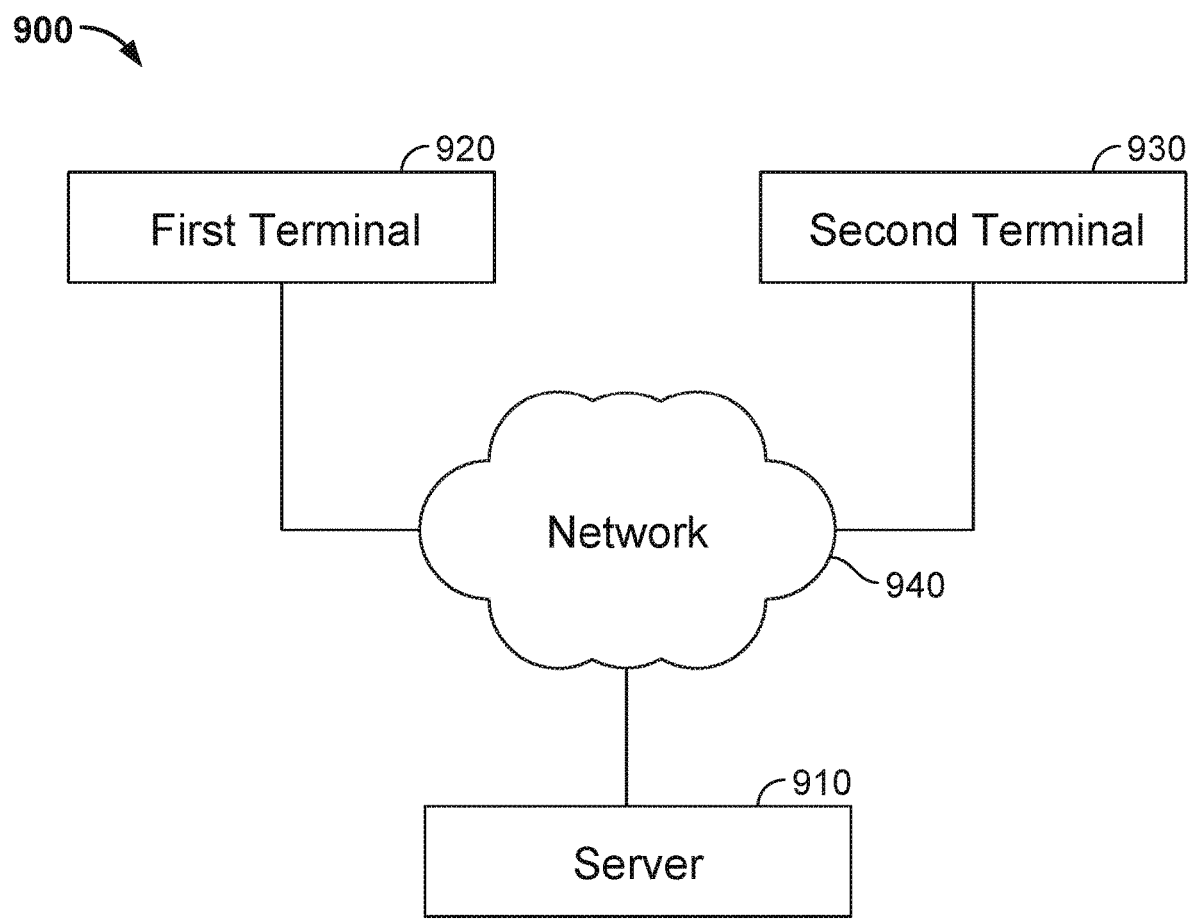
FIG. 9 illustrates a diagram of an embodiment illustrating a system for sharing data.

FIG. 9 illustrates a diagram of an embodiment illustrating a system for sharing data. In some embodiments, the system 900 is configured to perform the process 100 of FIG. 1A and process 200 of FIG. 2 and comprises: a server 910, a first terminal 920, and a second terminal 930, which are connected via a network 940.

In some embodiments, the first terminal 920 receives a data-sharing instruction associated with an information card, and invokes a communication app to perform a specific operation.

In some embodiments, the specific operation includes: transmitting to-be-shared information card data to the second terminal 930, or transmitting an identifier for the information card to the second terminal 930 so that the second terminal 930 downloads the information card data based on the identifier.

In some embodiments, the first terminal 920 obtains, via a local terminal app, data provided by a local communication app, and obtains information card data in a data format supported by the local terminal app based on the obtained data.

Figure 10:
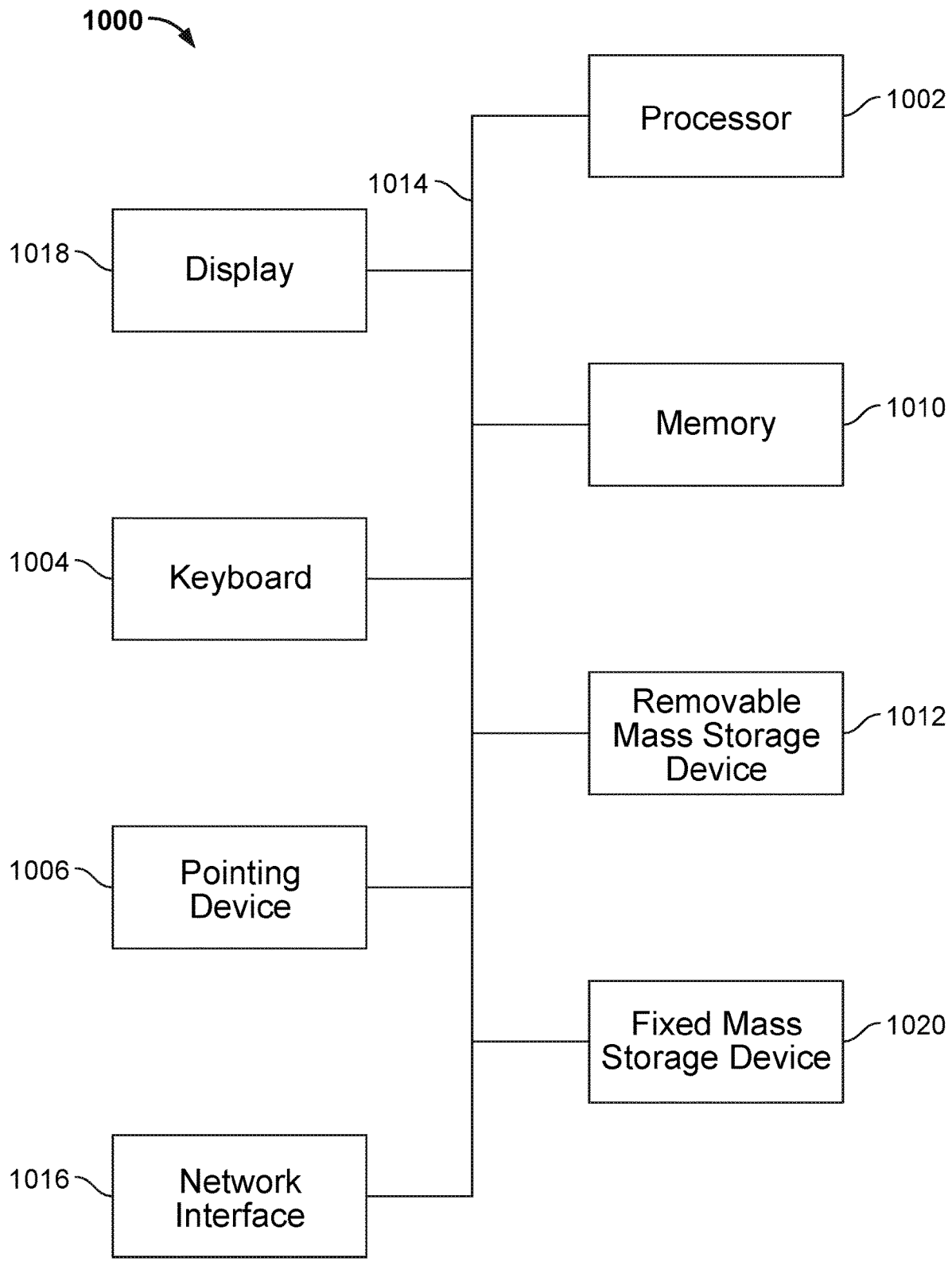
FIG. 10 is a functional diagram illustrating an embodiment of a programmed computer system for sharing data.

FIG. 10 is a functional diagram illustrating an embodiment of a programmed computer system for sharing data. As will be apparent, other computer system architectures and configurations can be used to share data. Computer system 1000, which includes various subsystems as described below, includes at least one microprocessor subsystem (also referred to as a processor or a central processing unit (CPU)) 1002. For example, processor 1002 can be implemented by a single-chip processor or by multiple processors. In some embodiments, processor 1002 is a general purpose digital processor that controls the operation of the computer system 1000. Using instructions retrieved from memory 1010, the processor 1002 controls the reception and manipulation of input data, and the output and display of data on output devices (e.g., display 1018).

Processor 1002 is coupled bi-directionally with memory 1010, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1002. Also as is well known in the art, primary storage typically includes basic operating instructions, program code, data, and objects used by the processor 1002 to perform its functions (e.g., programmed instructions). For example, memory 1010 can include any suitable computer-readable storage media, described below, depending on whether, for example, data access needs to be bi-directional or uni-directional. For example, processor 1002 can also directly and very rapidly retrieve and store frequently needed data in a cache memory (not shown).

A removable mass storage device 1012 provides additional data storage capacity for the computer system 1000, and is coupled either bi-directionally (read/write) or unidirectionally (read only) to processor 1002. For example, storage 1012 can also include computer-readable media such as magnetic tape, flash memory, PC-CARDS, portable mass storage devices, holographic storage devices, and other storage devices. A fixed mass storage 1020 can also, for example, provide additional data storage capacity. The most common example of mass storage 1020 is a hard disk drive. Mass storages 1012 and 1020 generally store additional programming instructions, data, and the like that typically are not in active use by the processor 1002. It will be appreciated that the information retained within mass storages 1012 and 1020 can be incorporated, if needed, in standard fashion as part of memory 1010 (e.g., RAM) as virtual memory.

In addition to providing processor 1002 access to storage subsystems, bus 1014 can also be used to provide access to other subsystems and devices. As shown, these can include a display monitor 1018, a network interface 1016, a keyboard 1004, and a pointing device 1006, as well as an auxiliary input/output device interface, a sound card, speakers, and other subsystems as needed. For example, the pointing device 1006 can be a mouse, stylus, track ball, or tablet, and is useful for interacting with a graphical user interface.

The network interface 1016 allows processor 1002 to be coupled to another computer, computer network, or telecommunications network using a network connection as shown. For example, through the network interface 1016, the processor 1002 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1002 can be used to connect the computer system 1000 to an external network and transfer data according to standard protocols. For example, various process embodiments disclosed herein can be executed on processor 1002, or can be performed across a network such as the Internet, intranet networks, or local area networks, in conjunction with a remote processor that shares a portion of the processing. Additional mass storage devices (not shown) can also be connected to processor 1002 through network interface 1016.

An auxiliary I/O device interface (not shown) can be used in conjunction with computer system 1000. The auxiliary I/O device interface can include general and customized interfaces that allow the processor 1002 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 10 is but an example of a computer system suitable for use with the various embodiments disclosed herein. Other computer systems suitable for such use can include additional or fewer subsystems. In addition, bus 1014 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving, via a local communication application, data from a sending terminal application invoking a sending terminal communication application, comprising:
A) invoking the local communication application to receive the data, the data including information card data associated with an information card; or
B) invoking the local communication application to obtain the data, the data including an information card identifier; and
downloading information card data associated with an information card based on the information card identifier;
obtaining, via the local communication application, the data provided by the local communication application;
obtaining, based on the data, the information card data in a data format supported by the local communication application;
receiving an operation instruction directed at the information card data; and
performing an operation corresponding to the operation instruction, comprising:
invoking the communication application to transmit update information associated with the information card data to a receiving terminal;
causing the receiving terminal to delete or hide the information card data stored locally on the receiving terminal;
sending to the server a disable request including an identifier for the receiving terminal so that the server refuses to process information requests that are sent by the receiving terminal and that are associated with the information card data; and
sending a recall notice to the receiving terminal.

2. The method as described in claim 1, wherein the downloading of the information card data associated with the information card comprises:
downloading the information card data that corresponds to the identifier and that is in a data format supported by the local communication application; or
downloading the information card data that corresponds to the identifier, and transforming a format of the downloaded information card data into a data format supported by the local communication application.

3. The method as described in claim 2, wherein the downloading of the information card data associated with the information card comprises:
receiving a download-authority identifier sent by a sending terminal; and
sending the download-authority identifier to the server to obtain the information card data provided by the server based on the download-authority identifier.

4. A method, comprising:
receiving a data-sharing instruction associated with an information card, the information card relating to an electronic card to be displayed on a display screen;
invoking a communication application to perform a specific operation, the specific operation comprising:
A) determining a set field from among fields included within information card data associated with the information card; and
transmitting to-be-shared information card data of the set field to a receiving terminal, the receiving terminal relating to a mobile device; or
B) determining a field where an information card identifier is located from among fields associated with the information card; and
transmitting the information card identifier of the determined field to a receiving terminal for the receiving terminal to download information card data associated with the information card based on the information card identifier;
receiving an operation instruction directed at the information card data; and
performing an operation corresponding to the operation instruction, comprising:
invoking the communication application to transmit update information associated with the information card data to the receiving terminal;
causing the receiving terminal to delete or hide the information card data stored locally on the receiving terminal;
sending to the server a disable request including an identifier for the receiving terminal so that the server refuses to process information requests that are sent by the receiving terminal and that are associated with the information card data; and
sending a recall notice to the receiving terminal.

5. The method as described in claim 4, wherein the transmitting of the information card identifier of the determined field to a receiving terminal for the receiving terminal to download information card data associated with the information card comprises:
sending an identifier for the receiving terminal to the server to determine that the receiving terminal has download authority for the information card data based on the identifier for the receiving terminal.

6. The method as described in claim 4, wherein the transmitting of the information card identifier of the determined field to a receiving terminal for the receiving terminal to download information card data associated with the information card comprises:
sending a download-authority identifier to the receiving terminal for the receiving terminal to download the information card data based on the download-authority identifier.

7. The method as described in claim 4, wherein the transmitting of the to-be-shared information card data of the set field to the receiving terminal comprises:
converting the to-be-shared information card data to a data format supported by a terminal application; and
invoking the communication application to send the converted to-be-shared information card data to the receiving terminal based on a communication protocol supported by the communication application.

8. The method as described in claim 4, wherein the transmitting of the information card identifier of the determined field to a receiving terminal for the receiving terminal to download information card data associated with the information card comprises:

converting the information card identifier to a data format supported by a terminal application; and invoking the communication application to send the converted information card identifier to the receiving terminal based on a communication protocol supported by the communication application so that the receiving terminal downloads the information card data based on the converted information card identifier.

9. The method as described in claim 4, further comprising:

prior to the receiving of the data-sharing instruction associated with the information card:

displaying a data-sharing trigger entry on an information card interface; and in response to a user's triggering the data-sharing trigger entry on the information card interface, receiving the data-sharing instruction associated with the information card.

10. The method as described in claim 4, further comprising:

prior to the receiving of the data-sharing instruction associated with the information card:

displaying a data-sharing trigger entry on an information card interface; and in response to a user's triggering the data-sharing trigger entry on the information card interface, receiving the data-sharing instruction associated with the information card;

wherein:

the data-sharing trigger entry is one of a plurality of trigger entries corresponding to a plurality of data-sharing instructions, each data-sharing instruction indicating corresponding data that is to be shared.

11. The method as described in claim 4, further comprising:

prior to the receiving of the data-sharing instruction associated with the information card:

displaying a data-sharing trigger entry on an information card interface; and in response to a user's triggering the data-sharing trigger entry on the information card interface, receiving the data-sharing instruction associated with the information card;

wherein:

the data-sharing trigger entry is one of a plurality of trigger entries corresponding to a plurality of data-sharing instructions, each data-sharing instruction indicating corresponding data that is to be shared; and a data-sharing instruction among the plurality of data-sharing instructions is configured to:

indicate a sharing technique for sharing the data; and invoke the communication application to perform the specific operation, comprising to:

invoke the communication application that supports the sharing technique to perform the specific operation.

12. The method as described in claim 4, wherein the transmitting of the to-be-shared information card data of the set field to the receiving terminal further comprises:

processing the received information card data, wherein the processing of the received information card data comprises filling the received information card data into a set template; and invoking the communication application to transmit the processed information card data to the receiving terminal.

13. The method as described in claim 4, wherein the information card data in the set fields comprises a unique identifier for the information card.

14. The method as described in claim 4, wherein the information card data in the set fields further comprises one or more of: a service type of the information card, user attributes of the information card, a display title of the information card, descriptive information for the information card, image information associated with the information card, and/or display style of the information card.

15. A computer program product being embodied in a tangible non-transitory computer readable storage medium and comprising computer instructions for:

receiving a data-sharing instruction associated with an information card, the information card relating to an electronic card to be displayed on a display screen; and invoking a communication application to perform a specific operation, the specific operation comprising:

A) determining a set field from among fields included within information card data associated with the information card; and transmitting to-be-shared information card data of the set field to a receiving terminal, the receiving terminal relating to a mobile device; or B) determining a field where an information card identifier is located from among fields associated with the information card; and transmitting the information card identifier of the determined field to a receiving terminal for the receiving terminal to download information card data associated with the information card based on the information card identifier;

receiving an operation instruction directed at the information card data; and performing an operation corresponding to the operation instruction, comprising:

invoking the communication application to transmit update information associated with the information card data to the receiving terminal;

causing the receiving terminal to delete or hide the information card data stored locally on the receiving terminal;

sending to the server a disable request including an identifier for the receiving terminal so that the server refuses to process information requests that are sent by the receiving terminal and that are associated with the information card data; and sending a recall notice to the receiving terminal.

16. A computer program product being embodied in a tangible non-transitory computer readable storage medium and comprising computer instructions for:

receiving, via a local communication application, data from a sending terminal application invoking a sending terminal communication application, comprising:

A) invoking the local communication application to receive the data, the data including information card data associated with an information card; or B) invoking the local communication application to obtain the data, the data including an information card identifier; and
  downloading information card data associated with an information card based on the information card identifier;
obtaining, via the local communication application, the data provided by the local communication application;
obtaining, based on the data, the information card data in a data format supported by the local communication application;
receiving an operation instruction directed at the information card data; and
performing an operation corresponding to the operation instruction, comprising:
  invoking the communication application to transmit update information associated with the information card data to a receiving terminal;
  causing the receiving terminal to delete or hide the information card data stored locally on the receiving terminal;
  sending to a server a disable request including an identifier for the receiving terminal so that the server refuses to process information requests that are sent by the receiving terminal and that are associated with the information card data; and
  sending a recall notice to the receiving terminal.

17. A system for sharing data, comprising:
a processor; and
a memory coupled with the processor, wherein the memory is configured to provide the processor with instructions which when executed cause the processor to:
  receive a data-sharing instruction associated with an information card, the information card relating to an electronic card to be displayed on a display screen; and
  invoke a communication application to perform a specific operation, the specific operation comprising to:
  A) determine a set field from among fields included within information card data associated with the information card; and
    transmit to-be-shared information card data of the set field to a receiving terminal, the receiving terminal relating to a mobile device; or
  B) determine a field where an information card identifier is located from among fields associated with the information card; and
    transmit the information card identifier of the determined field to a receiving terminal for the receiving terminal to download information card data associated with the information card based on the information card identifier;
  receive an operation instruction directed at the information card data; and
  perform an operation corresponding to the operation instruction, comprising:
    invoke the communication application to transmit update information associated with the information card data to the receiving terminal;
    cause the receiving terminal to delete or hide the information card data stored locally on the receiving terminal;
    send to the server a disable request including an identifier for the receiving terminal so that the server refuses to process information requests that are sent by the receiving terminal and that are associated with the information card data; and
    send a recall notice to the receiving terminal.

18. A system for sharing data, comprising:
a processor; and
a memory coupled with the processor, wherein the memory is configured to provide the processor with instructions which when executed cause the processor to:
  receive, via a local communication application, data from a sending terminal application invoking a sending terminal communication application, comprising to:
  A) invoke the local communication application to receive the data, the data including information card data associated with an information card; or
  B) invoke the local communication application to obtain the data, the data including an information card identifier; and
    download information card data associated with an information card based on the information card identifier;
  obtain, via the local communication application, the data provided by the local communication application;
  obtain, based on the data, the information card data in a data format supported by the local communication application;
  receive an operation instruction directed at the information card data; and
  perform an operation corresponding to the operation instruction, comprising:
    invoke the communication application to transmit update information associated with the information card data to a receiving terminal;
    cause the receiving terminal to delete or hide the information card data stored locally on the receiving terminal;
    send to a server a disable request including an identifier for the receiving terminal so that the server refuses to process information requests that are sent by the receiving terminal and that are associated with the information card data; and
    send a recall notice to the receiving terminal.

* * * * *